United States Patent [19]  [11] 4,092,186
Gordon et al.  [45] May 30, 1978

[54] COMBUSTION INHIBITED ROCKET PROPELLANTS

[75] Inventors: Stuart Gordon, Cleobury Mortimer; Geoffrey Ian Evans, Bewdley, both of England

[73] Assignee: Imperial Metal Industries (Kynoch) Limited, Warwickshire, England

[21] Appl. No.: 802,531

[22] Filed: Jun. 1, 1977

Related U.S. Application Data

[63] Continuation of Ser. No. 381,487 Jul. 23, 1973, abandoned, which is a continuation of Ser. No. 137,949, Apr. 27, 1971, abandoned.

[30] Foreign Application Priority Data

May 6, 1970  United Kingdom ............... 21857/70

[51] Int. Cl.² ............................................. C06B 45/28
[52] U.S. Cl. ........................................ 149/10; 149/11; 102/103
[58] Field of Search ................. 102/103; 149/10, 11

[56] References Cited

U.S. PATENT DOCUMENTS

3,954,701  5/1976  Schaffling ........................ 102/103 X

Primary Examiner—Stephen J. Lechert, Jr.
Attorney, Agent, or Firm—Cushman, Darby & Cushman

[57] ABSTRACT

Solid propellant charge bonded directly to combustion inhibition material comprising elastomeric or polymeric material containing a compatible particulate filler material constituting at least 50wt.% of the combustion inhibition material.

8 Claims, No Drawings

COMBUSTION INHIBITED ROCKET PROPELLANTS

This is a continuation of application Ser. No. 381,487 filed July 23, 1973 as a continuation of application Ser. No. 137,949 filed Apr. 27, 1971, now both abandoned.

BACKGROUND OF THE INVENTION

This invention relates to rocket propellants and is concerned with solid propellant charges provided with combustion inhibitors.

The arrangement of solid fuel rocket propellant charges in rocket motor cases falls into either of two classes. The first class is that of the case-bonded propellant charge in which the charge is bonded to the interior surface of a rocket motor case (i.e. body), and this bonding is frequently effected through a layer of combustion inhibition material. The second class is one in which the charge is a "grain" of solid fuel propellant which is self-supporting, and of which most of the external surface can be provided with a directly bonded layer of combustion inhibition material. The grain is then loaded into a rocket motor case and is secured therein by any convenient means. The present invention relates to the combustion inhibition material which can be used with both of the above two classes of solid fuel rocket propellant.

The principal function of the combustion inhibition material is to protect the surface of the propellant charge to which it is bonded from combustion. Thus only the areas of the propellant charge which are not coated with combustion inhibition material will combust.

A typical combustion inhibition material is cellulose acetate. This bonds well to the surface of most propellant charges, particularly the double-base propellants based on nitrocellulose and nitroglycerine which are known to those versed in the art to be of reduced smoke evolution. For such a double-base propellant charge the good bonding effect principally arises from the mutual solubility of the cellulose acetate and nitroglycerine, but although this gives a good bond, it provides a poor storage life because the cellulose acetate continually receives nitroglycerine and in time becomes highly combustible itself, thereby no longer acting to inhibit combustion.

To provide a longer storage life, it has been proposed to replace cellulose acetate by elastomeric materials which can be polymeric or non-polymeric. Suitable elastomeric materials can be bonded satisfactorily to solid propellants, and can be selected so as to be impermeable by nitroglycerine, but they suffer from the disadvantage that during combustion of the propellant at least some of the elastomer will also be combusted, and this can produce large volumes of dense smoke. The smoke has two principal disadvantages of which the first is that the flight of the rocket can be badly obscured from view to render visual guidance of the rocket difficult, and of which the second is that, conversely, the flight of the rocket is so well-marked that it can be easily observed and tracked from a distance.

It is an object of the present invention to provide a combustion inhibitor for solid fuel rocket propellants which is efficient for inhibiting combustion and which does not suffer from the disadvantage of emitting obscuring smoke when combusted.

SUMMARY OF THE INVENTION

In accordance with the present invention a solid propellant charge for a rocket motor is bonded directly to combustion inhibition material comprising elastomeric material containing a compatible particulate filler material which constitutes at least 50wt.% of the combustion inhibition materal, the filler material comprising at least one of the group consisting of elemental carbon and oxides, hydroxides, carbonates, sulphates, and nitrates of at least one element selected from:

(a) beryllium, magnesium, calcium, zinc, strontium, cadmium and barium;
(b) boron and aluminium;
(c) silicon and titanium;
(d) arsenic, antimony and bismuth; and
(e) iron, cobalt and nickel, the filler material and the sizes of the particles thereof in the combustion inhibition material being such that combustion of the combustion inhibition material results in a product wholly gaseous or containing particles which are of a size less than 1 micron or greater than 15 microns.

The lists of elements (a) to (e) given above fall respectively into Groups II, IIIA, IV, VB and VIII of the Periodic Table set out on Page XXVIII of the Introduction to Volume I of "Chemical Elements and their Compounds" by N. V. Sidgwick.

The solid propellant charge may be case-bonded into a rocket case or may be a self-supporting "grain".

Preferably the particles of filler material in the combustion inhibition material are less than 1 micron in size whereby, provided that there is no substantial accretion of the particles during combustion, the product of combustion will be wholly gaseous or will contain particles of a size less than 1 micron. If the filler material is dimensionally unchanged by combustion of the combustion inhibition material, the sizes of the particles of filler material in the combustion inhibition material can be greater than 15 microns, preferably 20 microns. If the filler material is combusted to a wholly gaseous product with combustion of the combustion inhibition material, the sizes of the particles of the filler material in the combustion inhibition material are of less importance provided that any filler material particles residual after such combustion are of a size less than 1 micron.

It can be comprehended from the above that for chosen elastomeric and filler materials, only simple experiment is needed to decide if the sizes of the particles of filler material in the combustion inhibition material are important, and if so which sizes are appropriate.

Preferably the filler material comprises at least one of the group consisting of oxides, hydroxides, carbonates, sulphates, and nitrates of at least one element selected from iron, titanium, zinc, barium, calcium, magnesium, strontium, antimony an aluminium.

Preferably also the filler material comprises an oxide of iron, titanium, zinc, barium, calcium, magnesium, strontium, antimony or aluminium.

The choices of the filler and elastomeric materials are interrelated because different elastomeric materials will provide different combustion conditions which would therefore have varying effects upon the filler materials subjected thereto, and similarly the nature, proportion and size distribution of the filler material will affect the combustion of the elastomeric material. In addition there will be a physical interrelationship between the filler and elastomeric materials from the two principal points of view of relative proportions and compatibility. From the first point of view of relative proportions, it is preferred that the combustion inhibition material contain as high a quantity as possible of the filler material so that in some circumstances up to 90wt.% of the combustion inhibition material may be constituted by the filler material. The principal advantages of having as high a proportion of filler material to elastomeric material as possible are that there will then be the minimum quantity of elastomeric material combusted during combustion of a given weight or volume of combustion inhibition material so that a minimum proportion of the product of combustion will stem from the elastomeric material which is prone to produce smoky exhausts. In addition the filler material provides erosion resistance, reduces the overall thermal conductivity of the combustion inhibition material whereby it is kept as cool as possible during combustion conditions, and increases the specific thermal capacity of the combustion inhibition material to enable it to absorb heat with the minimum rise in temperature. Since the region of maximum heat flux is at the propellant-to-inhibitor interface, the combustion inhibition material is bonded directly to the propellant charge so as to avoid local smoke-producing combustion. The presence of unfilled material or material of a less highly filled nature in proximity to the combusting propellant surfaces would by promoting combustion and/or erosion of the elastomer contribute to the smoke or obscuration of the motor efflux.

From the second point of view the physical elastomeric properties of the combustion inhibition material should not be degraded excessively. Thus the combustion inhibition material should still be capable of bonding to the solid fuel rocket propellant charge and, for a case-bonded propellant charge, to the case of the rocket motor. In addition the combustion inhibition material should still provide a reasonably satisfactory storage life, for example by being of sufficient mechanical strength, and not being brittle, particularly at low storage temperatures.

Specific elastomeric materials which have been found to be satisfactory are natural rubber, silicone-based elastomers, polyethylene, chloro-sulphonated polyethylene elastomers, polyurethane, butyl rubber elastomers, vinyl acetate copolymers with or without methacrylic acid, and ethylene propylene terpolymers.

DESCRIPTION OF THE PREFERRED EMBODIMENTS

There will now be described specific examples of combustion inhibition materials for use with nitrocellulose-nitroglycerine cast double-base propellants. In all of these examples, an adequate bond was achieved between the combustion inhibition material and cast double-base nitrocellulose-nitroglycerine rocket propellant by a layer of a polyvinyl acetal, preferably polyvinyl formal.

EXAMPLE 1

In the first example the combustion inhibition material consisted of chloro-sulphonated polyethylene into which was compounded iron oxide having a particle size of 0.15 micron, the relative proportions between the elastomer and the iron oxide filler material being 1 part of elastomer to 3 parts of filler materials.

This combustion inhibition material was used to inhibit the required surfaces of a cast double-base nitrocellulose-nitroglycerine solid propellant grain, and did so satisfactorily without producing obscurating smoke on firing.

EXAMPLE 2

In this example a combustion inhibition material was prepared by compounding together 1 part by weight of chloro-sulphonated polyethylene and 4 parts by weight of barium sulphate.

The compound adequately served to inhibit combustion without producing obscurating smoke.

EXAMPLE 3

In this example one part of natural rubber was compounded with 7 parts of iron oxide ($Fe_2O_3$) to produce a combustion inhibition material. This material adequately inhibited combustion without producing obscurating smoke when used in conjunction with cast doublebase nitrocellulose-nitroglycerine rocket propellants.

It is to be noted that natural rubber has a high capacity to be compounded with filler materials without excessive degradation of its physical and chemical properties, and that in this way natural rubber can be successfully used as a basis for combustion inhibition material despite the very smoky exhaust which stems from the use of natural rubber alone. This example can be modified to incorporate up to 10 parts by weight of iron oxide with 1 part of natural rubber.

Other filler materials which have been used successfully are titanium dioxide and beryllium oxide.

It is to be understood that the combustion inhibition materials of the present invention are best used with a solid fuel rocket propellant which is itself smokeless.

We claim:

1. A solid propellant charge for a rocket motor comprising a solid fuel smokeless propellant, and combustion inhibition material, the combustion inhibition material being bonded directly to the surfaces of the propellant of which combustion is to be inhibited, and the combustion inhibition material being of elastomeric material containing a compatible particulate filler material which constitutes at least 50wt% of the combustion inhibition material, the filler material contributing to a lower thermal conductivity than that of the elastomeric material alone and comprising at least one of the group consisting of oxides, hydroxides, carbonates and sulphates of at least one element selected from:
   (a) beryllium, magnesium, calcium, zinc, strontium, cadmium and barium;
   (b) aluminium;
   (c) titanium;
   (d) arsenic, antimony and bismuth; and
   (e) iron, cobalt and nickel,
the filler material and the sizes of the particles thereof in the combustion inhibition material being such that combustion of the combustion inhibition material results in a product wholly gaseous or containing particles which are of a size less than 1 micron or greater than 15 microns.

2. A charge according to claim 1 wherein the filler material comprises at least one of the group consisting of oxides, hydroxides, carbonates and sulphates of at least one element selected from iron, titanium, zinc, barium, calcium, magnesium, strontium, antimony and aluminium.

3. A charge according to claim 2 wherein the filler material comprises an oxide of iron, titanium, zinc, barium, calcium, magnesium, strontium, antimony or aluminium.

4. A charge according to claim 1 wherein the elastomeric material is selected from the group consisting of natural rubber, silicone-based elastomers, polyethylene, chloro-sulphonated polyethylene elastomers, polyurethane, butyl rubber elastomers, vinyl acetate copolymers with or without methacrylic acid, and ethylene propylene terpolymers.

5. A charge according to claim 1 wherein the propellant is cast double-base nitrocellulose-nitroglycerine propellant.

6. A charge according to claim 1 wherein the filler material constitutes at least 90% of the combustion inhibition material.

7. A charge according to claim 1 wherein the particles of filler material are less than 1 micron in size.

8. A charge according to claim 7 wherein the filler material comprises particulate iron oxide ($Fe_2O_3$) having a particle size of about 0.15 micron.

* * * * *